MYERS, WALSER & SPANGLER.
Bee Hive.
No. 64,557.
Patented May 7, 1867.
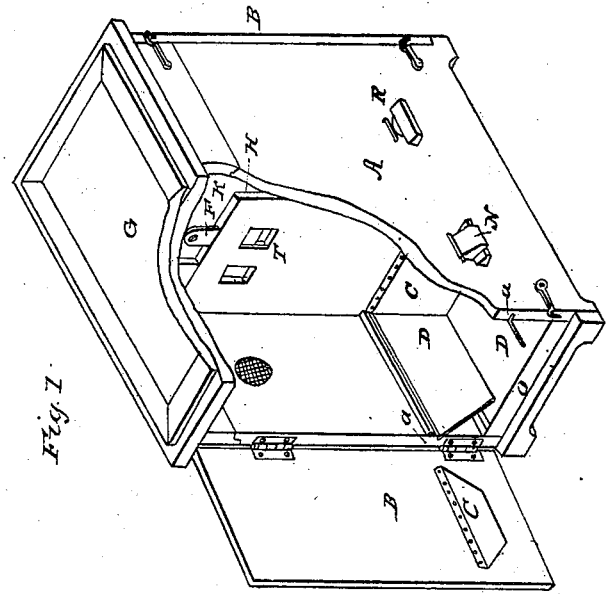
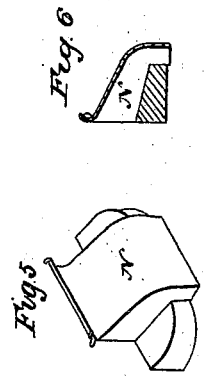
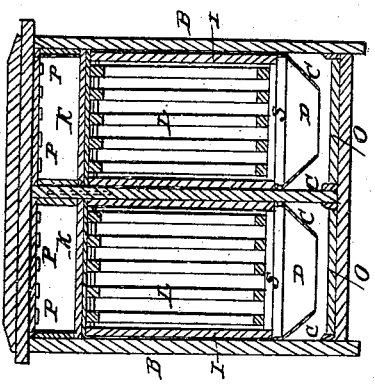
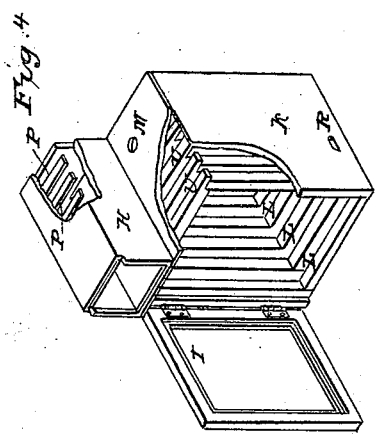
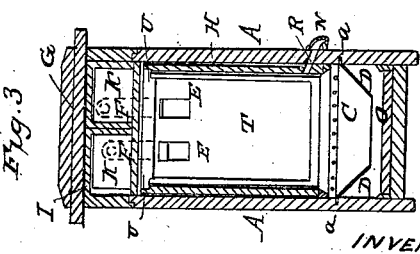

United States Patent Office.

PETER M. MYERS, JOHN W. WALSER, AND JOHN SPANGLER, OF CANTON, OHIO.

Letters Patent No. 64,557, dated May 7, 1867; antedated November 7, 1866.

IMPROVEMENT IN BEE-HIVES.

*The Schedule referred to in these Letters Patent and making part of the same.*

TO ALL WHOM IT MAY CONCERN:

Be it known that we, PETER M. MYERS, JOHN W. WALSER, and JOHN SPANGLER, of Canton, in the county of Stark, and State of Ohio, have invented new and valuable Improvements in Bee-Hives; and we do hereby declare that the following is a full, clear, and exact description thereof, reference being had to the annexed drawings, forming a part of this specification, and to the letters of reference marked thereon, in which drawings—

Figure 1 is a perspective of the bee-hive.
Figure 2 is a transverse section.
Figure 3 is a cross-section.
Figure 4 is a perspective view of part of the boxes.
Figure 5 is a perspective view of the bee-valve; and
Figure 6, a cross-section of the same.

The nature of our invention consists in the peculiar combination and arrangement of a double bee-hive, each side having living-boxes, honey-boxes, &c., and so arranged as to be open and connected with each other, or separated from each other, and the bees caused to go from one side to the other, so as to allow of free access to the interior of the hive without danger of being stung; also, in the use of fixed and movable slides, forming a hopper, into which moths and worms falling from the bee-comb are received, and which prevents their return; and by removing the said movable slides the bees can be hived by placing them on the drawer below, when they can be pushed directly under the combs and allowed to ascend at will; also, in the use of a peculiarly shaped bee-valve by which the bees are allowed to pass out from one side of the hive, but cannot return, and are compelled to enter the other side; by the aid of which improvements we claim that all the managing necessary to the welfare of the bees can be effected, with no danger of stinging, that they can readily be cleaned and hived, and are at all times easy to examine, thus fulfilling all the requirements of a perfect bee-hive.

To enable others skilled in the art to make and use our invention, we will proceed to describe its construction and operation.

The outer box or main hive A is divided into two equal and symmetrical parts by the partition T, each part having doors, B, at its end, and having a common cover, G. In each of these parts are placed the living-boxes H, of the form shown in fig. 4. They are supported by the slats S, and slide in and out like drawers. On the boxes H are placed the covers M, and on the covers M are placed the honey-boxes K. In the boxes H the frames L are hung, being supported by the projecting tops of the frames U resting on a groove made on the sides of the boxes H, and on the front of the boxes H are hung the doors I, having glass in them, so that the condition of the combs on the frames L can be seen at any time. The honey-boxes K have slats, P, on which to form the combs, and have glass fronts, so as to be readily examined. Under the boxes H are placed the pieces C C D D, which form a hopper, C D C D, into which the moths and worms fall from the combs, and by these pieces are prevented from crawling back. In falling through the hopper they are caught in the drawer O and can be removed every day. The bees pass through the opening R to the living-boxes H, and from these into the honey-boxes K through the opening W. Communication between the two parts of the hive is effected by means of the openings E, which are opened or closed by the slides F. The ventilator X is opened or closed by a button of simple form on the back of the hive, (not shown in the drawings,) and is covered with fine wire gauze to prevent the entrance of moths, worms, &c. By means of the peculiarly formed bee-valve N, as shown in figs. 5 and 6, the bees are allowed to pass out of the hive but cannot return, so that by closing the openings E and putting on the bee-valve N, as shown in fig. 1, the bees will pass out of the one part of the hive but cannot return, and so will seek entrance on the other side, so that when the combs in the frames I become foul, or when, from any other reason, the operator wishes to get into one part of the hive, he can cause the bees to pass into the opposite side by means of the bee-valve, and in a similar manner can cause them to return. The pieces D D of the hopper C D C D below the boxes H are made so as to slide out in grooves $a$ $a$, so that in hiving the bees the drawers O are drawn out, the bees placed on the forward part of the same, and the drawer is then returned, and the bees pass directly up into the living-boxes H.

It will readily be seen that the arrangement of this bee-hive is such that the bees are at all times easy to examine, and that all the manipulations required can be performed without coming in contact with any of the bees, and that by means of the two hives the bees may be kept for a long time without being allowed to swarm.

We do not claim as our invention the construction of the boxes H or K, nor the use of the ventilator X, nor the drawer O; but what we do claim as our invention, and desire to secure by Letters Patent, is—

1. The use of the four pieces C C D D, forming a complete hopper, C D C D, when the pieces C C are movable in grooves $a\ a$, substantially in the manner and for the purpose specified.

2. The peculiarly formed bee-valve N used in connection with the openings R, substantially in the manner and for the purpose specified; and 3. The peculiar combination and arrangements of double box A, having the living-boxes H H, honey-boxes K K K K, ventilators X, openings E E, slides F F, openings R R, hoppers C D C D, drawers O, doors B B and I I, arranged on each side thereof and cover G, substantially in the manner and for the purpose specified.

JOHN SPANGLER,
PETER M. MYERS,
J. W. WALSER.

Witnesses:
J. ABBOTT,
E. A. BEEBOUT.